Figure 1:
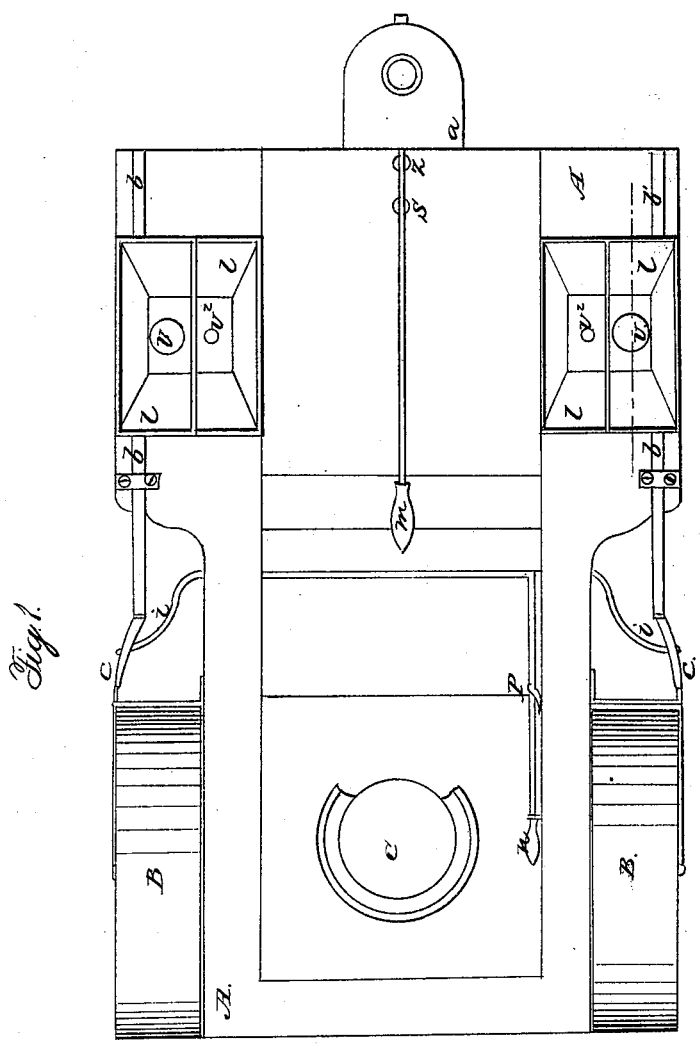

J. H. WIGGIN.
Corn Planter.

2 Sheets—Sheet 1.

No. 19,274.

Patented Feb. 2, 1858.

J. H. WIGGIN.
Corn Planter.
No. 19,274.
2 Sheets—Sheet 2.
Patented Feb. 2, 1858.
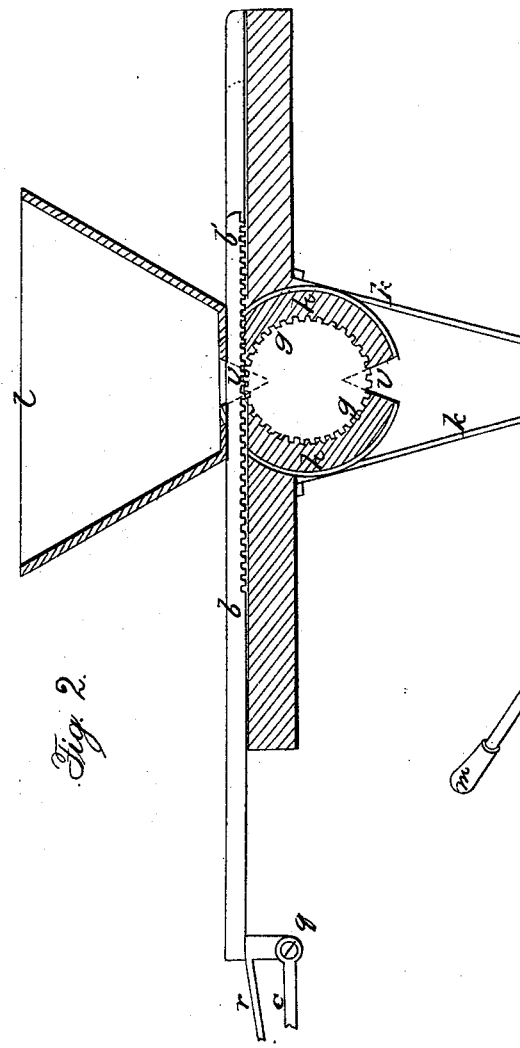
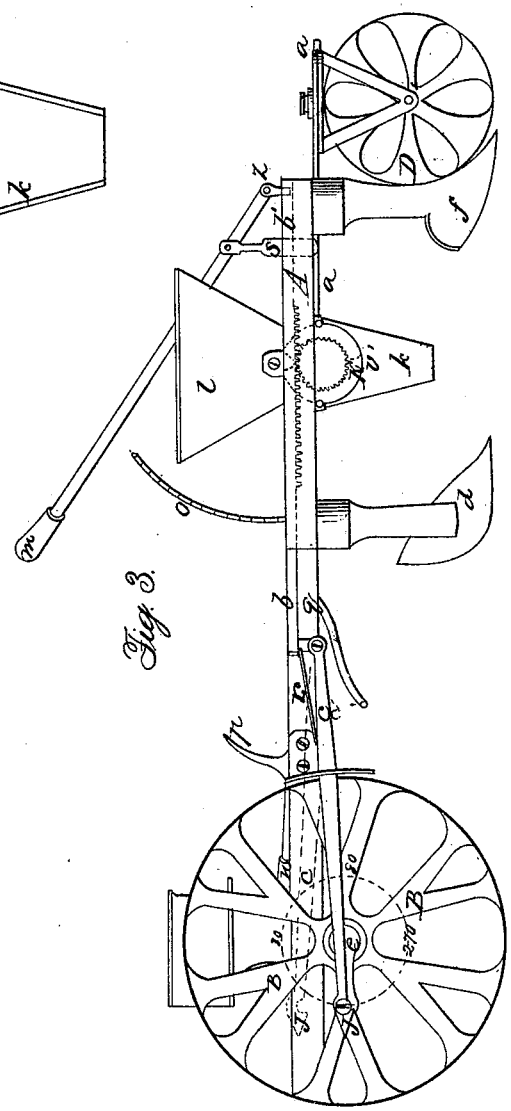

UNITED STATES PATENT OFFICE.

JOSEPH H. WIGGIN, OF BOSTON, MASSACHUSETTS.

IMPROVEMENT IN SEED-PLANTERS.

Specification forming part of Letters Patent No. 19,274, dated February 2, 1858.

*To all whom it may concern:*

Be it known that I, JOSEPH H. WIGGIN, of Boston, in the county of Suffolk and State of Massachusetts, have invented a new and Improved Method, Device, or Machine for Planting Maize or other Seeds in Hills, which I have fully set forth in the following specification, drawings, and letters of reference marked thereon.

The nature of the invention consists in the peculiar arrangement of the planting-cylinder and the reciprocating toothed bar operated by the rear wheel, which operates it in such manner that every forward movement of the bar gives to the seeding-cylinder a half a rotation on its axis, charges the seed-boxes with grain, &c., from the hopper and discharges the same into the hill, and that every return movement of the bar repeats the same operation.

To enable others skilled in the art to make and use my invention, I will proceed to describe its construction and operation.

The machine in its general form is rectangular, the width being about half its length. It has two rear wheels and a driver's seat between them, and one anterior wheel to sustain and guide the anterior portion of the planter. On each side of the forward wheel is a double hopper, each double hopper being designed to distribute guano from one of its apartments and seed from the other. Each one of the double hoppers is placed directly in front of its corresponding rear wheel, from the crank of whose shaft, by means of a shackle-bar and the toothed bar which meshes into the pinion of the seeding-cylinder, said cylinder is operated. There is, besides, a lever designed to work the shackle-bar of each side of the planter and detach each shackle-bar simultaneously from the crank of its corresponding rear wheel and thus stop the planting operation. There is also a second lever forward of the driver's seat to raise the plows out of the ground, elevating the fore part of the planter while the forward or guide wheel rests on the ground.

In the accompanying drawings, Figure 2 represents the hopper $l$, the seed-discharging boot $k\ k$, seeding-cylinder pinion $g\ g$, toothed bar $b\ b'$, and shackle-bar $c$. Fig. 3 represents a side elevation of the machine.

A A represent the frame-work of the planter; B B, the rear wheels, which operate the seeding-cylinders $h\ h$ by means of crank $e$, shackle-bar $c$, and toothed bar $b\ b'$.

C represents the driver's seat; D, the forward or guide wheel affixed to a draft-timber, $a$, hinged to a cross-timber between the seed-hoppers, but under the main frame, and not represented in the drawings.

Lever $m$, hinged at $z$, when borne down by the hand of the driver, presses by means of pin $s$ upon the draft-piece $a$ and raises the furrowing-plow $f$ and covering-plows $d$ out of the ground, as in traveling to and from the field.

A lever, $n$, is used to elevate and depress shackle-bars $c$, to detach and attach the seeding-gear to and from crank $e$ by means of the hook J. The movement of the lever is shown in Fig. 1, and the seeding-gear in Fig. 3. By raising lever $n$ so as to rest its arm on the projecting point $p$ bars $i\ i$ detach hooks J J from the cranks $e$ and stop the seeding. The construction of this part of the machine we will next proceed to describe.

That part of the machine which embodies the invention is seen in Figs. 2 and 3, where $h\ h$ represent the seeding-cylinder and V form seed-cups $g\ g$, the pinion on the end of cylinder having its cogs mesh into teeth of bar $b\ b'$, and through which it receives motion from the wheel B by means of the shackle-bar $c$. The shackle-bar is connected to $b$ by a joint at $q$, and is kept in its place by the spring $r$. (Seen in Fig. 3.) $v'$ is the seed-cup on the lower part of seed-cylinder, and $v^2$ is the guano-cup. The seeding-pinion $g\ g$ is designed to describe the same sized circle that the crank $e$ does. Every complete revolution of wheel B will consequently give two semi-revolutions of cylinder $h\ h$, but each semi-revolution will be in the opposite direction to the other semi-revolution. Thus (taking Fig. 3 as the guide) we will suppose crank $e$ to be carried back behind the wheel, as seen in Fig. 3, and the bar $b$ drawn as far as it can be in that direction, which brings $v$ vertically or upon the top of the seeding-cylinder, where it is filled. Now, let the wheel B go forward till the crank comes over from one degree through ninety to one hundred and eighty degrees, or to the extreme forward part of the wheel, or to the nearest point to the seed-cylinder, and it will be found that the cup $v$ has in the meantime moved around through $h'$ to $v'$, or one hundred and eighty degrees, and discharged its contents into the furrow, while $v'$ has traveled around on the opposite side to the central part of the hopper and received its charge. Now, let the wheel B again go forward the other half of its revolution. The crank $e$ will pass from its present position (the forward part) down through its nadir, or through two hundred and seventy degrees, and arrive at its starting-point, while at the same time the seed-cup $v'$, which we left filled under the hopper, will be found to have traveled backward through $h$ to the lowest part of its periphery, while $v$ has also traveled up through the opposite side to the highest part of its periphery. Thus at every revolution of the wheels B each seeding-hopper plants two hills of maize.

It will also be seen by inspecting Fig. 1 that the hopper is double by means of the partition, making two seed-cups on the same side of the seeding-cylinder, one of which may be used for sowing guano. $v^2$ is designed for that purpose; or it may with equal propriety be used for sowing other seeds, as beans or pumpkins.

Having fully described the construction and operation of my machine and the method of working the same, what I claim as my invention, and desire to secure by Letters Patent, is—

The arrangement of the seeding-cylinder $h$ $h'$ and toothed bar $b$ $b'$ for planting seed automatically, in the manner and for the purpose set forth herein.

JOSEPH H. WIGGIN.

Witnesses:
 EDM. F. BROWN,
 L. D. GALE.